United States Patent [19]

Hachisuka

[11] Patent Number: 4,803,913
[45] Date of Patent: Feb. 14, 1989

[54] HYDRAULIC POWER STEERING VALVE WITH THREE-ORIFICE REACTIVE CHAMBER PRESSURE CONTROL

[75] Inventor: Hiroshi Hachisuka, Nishio, Japan

[73] Assignee: Aisin Seiki Kabushiki Kaisha, Kariya, Japan

[21] Appl. No.: 183,395

[22] Filed: Apr. 13, 1988

Related U.S. Application Data

[63] Continuation of Ser. No. 741,243, Jun. 4, 1985, abandoned.

[30] Foreign Application Priority Data

Jun. 18, 1984 [JP] Japan .................................. 59-126221
Oct. 12, 1984 [JP] Japan .................................. 59-214890

[51] Int. Cl.⁴ .......................... B62D 5/06; B62D 5/08; F15B 13/14
[52] U.S. Cl. ........................................ 91/371; 91/380; 91/434; 180/143
[58] Field of Search .................... 91/222, 370–373, 91/380, 388, 422, 434, 443, 463; 137/625.69; 180/79.3, 136, 142, 143

[56] References Cited

U.S. PATENT DOCUMENTS

| | | | |
|---|---|---|---|
| 3,602,101 | 8/1971 | Jablonsky et al. | 91/422 |
| 3,719,124 | 3/1973 | Katz et al. | 91/434 |
| 4,249,456 | 2/1981 | Luckel et al. | 91/434 X |
| 4,438,827 | 3/1984 | Lang | 91/371 X |

FOREIGN PATENT DOCUMENTS

| | | | |
|---|---|---|---|
| 2211360 | 9/1973 | Fed. Rep. of Germany | 137/625.69 |
| 2317089 | 10/1974 | Fed. Rep. of Germany | 91/422 |
| 2327534 | 12/1974 | Fed. Rep. of Germany | 137/625.69 |
| 58-5574 | 1/1983 | Japan | 137/625.69 |
| 76367 | 5/1983 | Japan | 180/143 |
| 179455 | 10/1984 | Japan | 180/143 |

*Primary Examiner*—Robert E. Garrett
*Assistant Examiner*—George Kapsalas
*Attorney, Agent, or Firm*—Burns, Doane, Swecker & Mathis

[57] ABSTRACT

A power steering system for use in a motor has a pair of reactive pressure chambers in which the opposite ends of a valve spool are exposed, one of the reactive pressure chambers communicating with one fluid-pressure chamber in a reciprocable fluid-pressure cylinder assembly through a first orifice, the other reactive pressure chamber communicating with both fluid-pressure chambers in the cylinder assembly through second and third orifices, respectively. The first, second and third orifices are the first and second orifices are defined in the valve spool. A third passage define by a space between the spool and the valve cylinder communicates the first and third orifices.

5 Claims, 4 Drawing Sheets

HYDRAULIC POWER STEERING VALVE WITH THREE-ORIFICE REACTIVE CHAMBER PRESSURE CONTROL

This application is a continuation of application Ser. No. 741,243, filed June 4, 1985, now abandoned.

BACKGROUND OF THE INVENTION

1. Field of the Invention

The present invention relates to a power steering system using hydraulic pressure.

2. Description of the Prior Art

One prior power steering device using hydraulic pressure is disclosed in U.S. Pat. No. 3,602,101. As shown in FIG. 5 of the accompanying drawings, the disclosed power steering device has a valve spool S disposed between a pair of chambers C1, C2 supplied with a working fluid from a hydraulic-pressure pump P. When an input shaft is turned in one direction, the valve spool S is slid to the right by a valve rod L to open variable orifices VO1, VO3 and close variable orifices VO2, VO4. Therefore, the working fluid flows from the chamber C1 through a passage D1 into one fluid-pressure chamber E1 of a reciprocable fluid-pressure cylinder assembly E, while the working fluid flows from the other fluid-pressure chamber E2 through passages D2, D3 back into a reservoir R. The piston E3 of the fluid-pressure cylinder assembly E is then slid to the left due to the difference between the fluid pressures in the fluid-pressure chambers E1, E2. At this time, the fluid pressures in the fluid-pressure chambers E1, E2 are transmitted respectively through first and second orifices O1, O2 in the valve spool S into reactive pressure chambers G1, G2, respectively, which are defined in the valve spool S by reactive pistons F1, F2 slidably fitted in axial bores S1, S2, respectively, in the valve spool S and fixed to a valve cylinder A. The valve spool S is therefore subject to a leftward reactive force due to the difference between the fluid pressures in the reactive pressure chambers G1, G2. The reactive pressure chambers G1, G2 communicate with the working fluid passages only through the first and second orifices O1, O2, so that when the valve spool S tends to vibrate, the working fluid flows into and out of the reactive pressure chambers G1, G2 through the orifices O1, O2 to prevent the valve spool S from vibrating.

With the conventional power steering device, therefore, the reactive force on the valve spool is produced by applying the difference between the fluid pressures in the fluid-pressure chambers in the reciprocable fluid-pressure cylinder assembly to the valve spool. Since the fluid pressure difference is large, the surface area of the valve spool on which the fluid pressure acts should be considerably smaller than the cross-sectional area of the valve spool in order to generate a reactive force of an appropriate magnitude. One solution, which could be available in a small-size power steering device, would be to form reactive pressure chambers within the valve spool, but this construction would be complex and would not be manufactured at a reduced cost. Since such reactive pressure chambers would be small in cross-sectional area, the ability to prevent the valve spool from vibrating would not be so great, and the valve spool would tend to vibrate, giving the driver an impaired feel in steering the vehicle.

SUMMARY OF THE INVENTION

It is an object of the present invention to provide a power steering system in which a valve spool is subject to a reactive force produced by a differential fluid pressure which is different from a fluid pressure difference between the fluid-pressure chambers of a reciprocable fluid-pressure cylinder assembly.

According to the present invention, a power steering system for use in a motor vehicle includes a pair of reactive pressure chambers in which the opposite ends of a valve spool are exposed, one of the reactive pressure chambers communicating with one fluid-pressure chamber in a reciprocable fluid-pressure cylinder assembly through a first orifice, the other reactive pressure chamber communicating with the fluid-pressure chambers through second and third orifices, respectively.

When an input shaft is rotated in one direction, the valve spool slides to allow a working fluid to flow from a fluid-pressure pump into the one fluid-pressure chamber and also to allow the working fluid to flow from the other fluid-pressure chamber into a reservoir. At this time, the fluid pressure is transmitted from the one fluid-pressure chamber into the one reactive pressure chamber, while part of the working fluid supplied to the one fluid-pressure chamber flows through the third orifice into the other reactive pressure chamber and also flows through the second orifice into the reservoir. Therefore, a fluid pressure which is determined by the sizes of the second and third orifices and lower than the fluid pressure in the one reactive pressure chamber is transmitted to the other reactive pressure chamber. The difference between the fluid pressures in the reactive pressure chambers acts on the cross-sectional area of the valve spool to impose a reactive force on the valve spool. When the input shaft is rotated in the other direction, the valve spool is slid to allow the working fluid to flow from the fluid-pressure pump into the other fluid-pressure chamber and also to allow the working fluid to flow from the one fluid-pressure chamber into the reservoir. At this time, part of the working fluid supplied to the other fluid-pressure chamber flows through the second orifice into the other reactive pressure chamber and also flows through the third orifice into the reservoir. Therefore, a fluid pressure which is determined by the sizes of the second and third orifices and lower than the fluid pressure in the other reactive pressure chamber is transmitted to the one reactive pressure chamber. There is no pressure buildup in said one reactive pressure chamber. The difference between the fluid pressures in the reactive pressure chambers acts on the cross-sectional area of the valve spool to impose a reactive force on the valve spool. The reactive pressure chambers are defined simply by using spaces in the opposite ends of the valve cylinder, so that the cost of manufacture of the power steering system is lowered.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
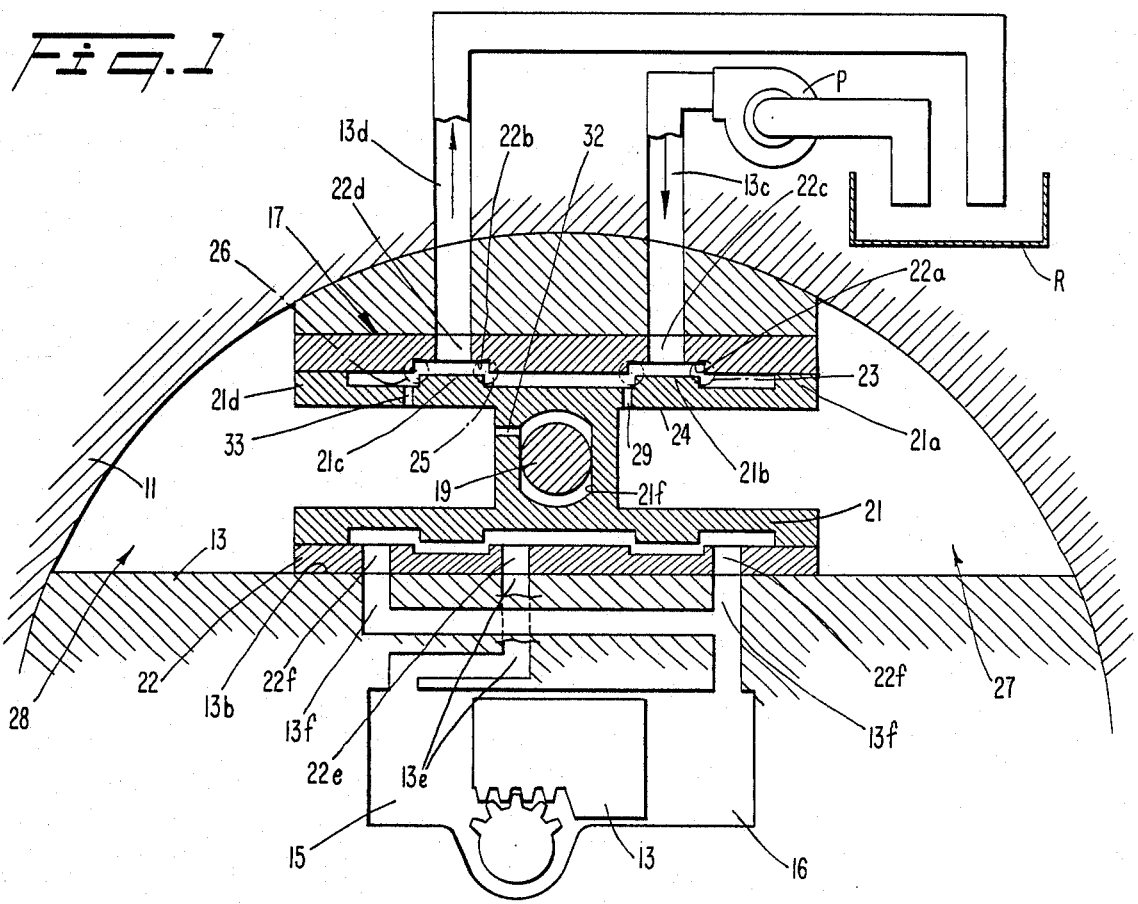
FIG. 1 is a cross-sectional view of a fluid-pressure control arrangement of a power steering system according to an embodiment of the present invention, the view being taken along line I—I of FIG. 2.
Figure 2:
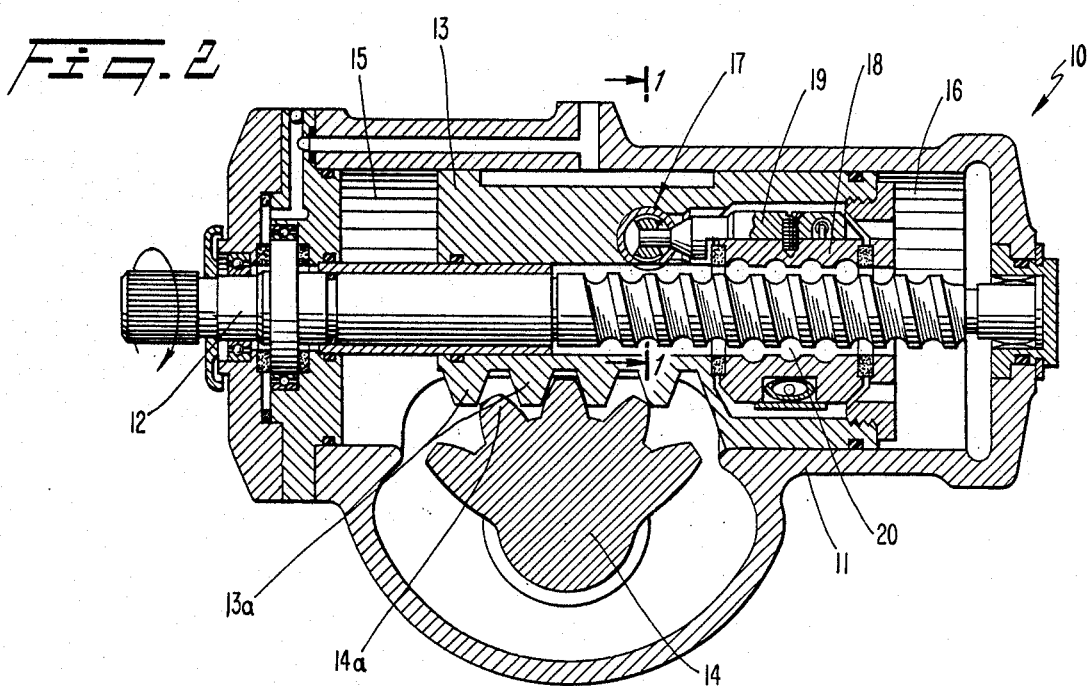
FIG. 2 is a longitudinal cross-sectional view of the power steering system.

As shown in FIGS. 1 and 2, a fluid-pressure-operated power steering system 10 includes a housing 11 fixed to a motor vehicle (not shown), an input shaft 12 such as a steering shaft rotatably supported in the housing 11, a piston 13 slidably fitted in the housing 11 in a fluid-tight manner and having a rack 13a, and an output shaft 14 rotatably mounted in the housing 11 and having a sector gear 14a meshing with the rack 13a. The input shaft 12 is coupled to a steering wheel (not shown), and the output shaft 14 is coupled to a steering link mechanism (not shown) connected to steerable wheels. The housing 11 and the piston 13 jointly constitute a reciprocable fluid-pressure cylinder assembly having fluid-pressure chambers 15, 16 one on each side of the piston 13.

In the piston 13, there are disposed a control valve device 17 for supplying one of the fluid-pressure chambers 15, 16 with a working fluid from a fluid-pressure pump P operated by the motor vehicle engine and for discharging the working fluid from the other fluid-pressure chamber into a reservoir R, and a nut 18 and a valve pin 19 for actuating the control valve device 17 in response to rotation of the input shaft 12. The nut 18 is held in threaded engagement with the input shaft 12 through balls 20 fitted in a screw thread defined in the outer peripheral surface of the input shaft 12 and a screw thread defined in the inner peripheral surface of the nut 18. The nut 18 is therefore rotatable, but axially immovable with respect to the piston 13. When the input shaft 12 is rotated about its own axis, the nut 18 rotates with the input shaft 12. The valve pin 19 is fixed to the nut 18 and has its free end fitted in a radial hole 21f defined in a valve spool 21 of the control valve device 17.

The control valve device 17 has a bushing 22 fitted in a transverse hole 13b in the piston 13, the valve spool 21 being slidably disposed in the bushing 22. The piston 13 and the bushing 22 have respective passages 13c, 22c communicating with the fluid-pressure pump P through a working-fluid inlet in the housing 11, respective passages 13d, 22d communicating with the reservoir R through a working-fluid outlet in the housing 11, respective passages 13e, 22e communicating with the fluid-pressure chamber 15, and respective passages 13f, 22f communicating with the fluid-pressure chamber 16. The bushing 22 also has circumferential grooves 22a, 22b defined in its inner circumferential surface. The valve spool 21 has lands 21a, 21b, 21c, 21d. The land 21b and the circumferential groove 22a form variable orifices 23, 24 therebetween, and the land 21c and the circumferential groove 22b form variable orifices 25, 26 therebetween. When the input shaft 12 is rotated in the direction of the arrow (FIG. 2), the nut 18 and the valve pin 19 rotate with the input shaft 12 to move the valve spool 21 to the right as shown in FIG. 1. Therefore, the variable orifices 24, 26 are enlarged while the variable orifices 23, 25 are reduced. The working fluid now flows from the fluid-pressure pump P through the passages 13c, the passage 22c, the variable orifice 24, the circumferential groove between the lands 21b, 21c, the passage 22e, and the passage 13e into the fluid-pressure chamber 15. At the same time, the working fluid flows from the fluid-pressure chamber 16 through the passage 13f, the passage 22f, the circumferential groove between the lands 21c, 21d, the variable orifice 26, the passage 22d, and the passage 13d into the reservoir R. As a consequence, the piston 13 is slid in one direction under the fluid pressure to move the steering link mechanism in one direction. When the input shaft 12 is rotated in the opposite direction, the valve spool 21 is moved to the left (FIG. 1) by the valve pin 19 so that the variable orifices 23, 25 are enlarged and the variable orifices 24, 26 are reduced. The working fluid then flows from the pump P through the passage 13c, the passage 22c, the variable orifice 23, the circumferential groove between the lands 21a, 21b, the passage 22f, and the passage 13f into the fluid-pressure chamber 16. At the same time, the working fluid flows from the fluid-pressure chamber 15 through the passage 13e, the passage 22e, the circumferential groove between the lands 21b, 21c, the variable orifice 25, the passage 22d, and the passage 13d into the reservoir R. As a consequence, the piston 13 is slid in the opposite direction under the fluid pressure to move the steering link mechanism in the opposite direction.

The opposite ends of the valve spool 21 are exposed respectively in reactive pressure chambers 27, 28 defined by the housing 11, the piston 13, the valve spool 21, and the housing 22. The reactive pressure chamber 27 communicates through a first orifice 29 defined in the valve spool 21 with the circumferential groove between the lands 21b, 21c, i.e., the fluid-pressure chamber 15. The reactive pressure chamber 28 communicates through third and second orifices 32, 33 defined in the valve spool 21 with a radial hole 21f in the valve spool 21 and the circumferential groove between the lands 21c, 21d, the radial hole 21f communicating with the circumferential groove between the lands 21b, 21c. Therefore, the reactive pressure chamber 28 communicates with the fluid-pressure chambers 15, 16.

When the working fluid from the pump P flows into the fluid-pressure chamber 15 and the working fluid from the fluid-pressure chamber 16 flows into the reservoir R, the fluid pressure from the fluid-pressure chamber 15 is transmitted to the reactive pressure chamber 27, and part of the working fluid supplied to the fluid-pressure chamber 15 flows through the third orifice 32 into the reactive pressure chamber 28 and then flows through the second orifice 33 into the reservoir R. Thus, the fluid pressure lower than that in the fluid-pressure chamber 15 is transmitted to the reactive pressure chamber 28. The difference between the fluid pressures in the reactive pressure chambers 27, 28 acts on the cross-sectional area of the valve spool 21 to push the latter to the left in FIG. 1, thereby imposing a reactive force on the input shaft 12. When the working fluid from the pump P flows into the fluid-pressure chamber 16 and the working fluid from the fluid-pressure chamber 15 flows into the reservoir R, part of the working fluid supplied to the fluid-pressure chamber 16 flows through the passages 13f, 22f and the second orifice 33 into the reactive pressure chamber 28 and then flows through the third orifice 32 into the reservoir R. Thus, the fluid pressure lower than that in the fluid-pressure chamber 16 is transmitted to the reactive pressure chamber 28. There is no pressure buildup in the reactive pressure chamber 27. The difference between the fluid pressures in the reactive pressure chambers 27, 28 acts on the cross-sectional area of the valve spool 21 to push the latter to the right in FIG. 1, thereby imposing a reactive force on the input shaft 12.

Figure 3:
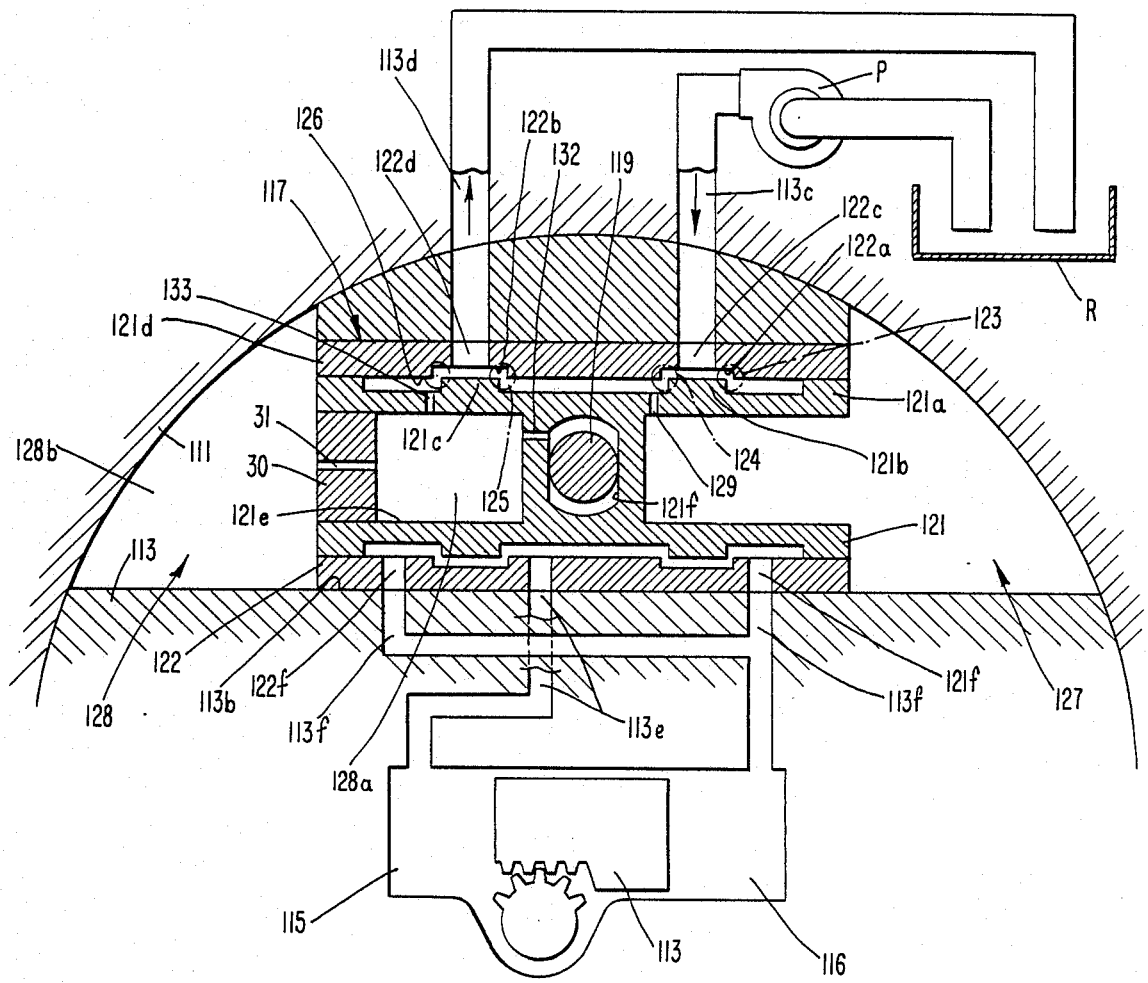
FIG. 3 is a view similar to FIG. 1, showing a power steering system according to another embodiment.

FIG. 3 shows a power steering system according to another embodiment of the present invention, which is designed to make a valve spool more resistant to vibrations. Those parts shown in FIG. 3 which are identical to the parts shown in FIG. 1 are denoted by identical reference characters of FIG. 1 as added to 100. In the embodiment of FIG. 3, a reactive pressure chamber 128 is divided into first and second chambers 128a, 128b by a plug 30 fixedly fitted in an axial bore 121e defined in a valve spool 121. The first and second chambers 128a, 128b are held in communication with each other through a fourth orifice 31 defined axially through the plug 30. The first chamber 128a communicates through third and second orifices 132, 133 with fluid-pressure chambers 115, 126.

The reactive pressure chamber 127 communicates with the working fluid passages only through the first orifice 129. When the valve spool 121 tends to vibrate, the working fluid flows into and out of the reactive pressure chamber 127 through the first orifice 129, thereby acting to prevent the valve spool 121 from vibrating. The second chamber 128b of the reactive pressure chamber 128 communicates with the working fluid passages through the fourth orifice 31. When the valve spool 121 tends to vibrate, the working fluid flows into and out of the second chamber 128b through the fourth orifice 31 for preventing the valve spool 121 from vibrating. Since the reactive pressure chambers 127, 128 serve to dampen the valve spool 121 and the fluid pressures in the reactive pressure chambers 127, 128 act on the cross-sectional area of the valve spool 121, the valve spool 121 is highly resistant to vibrations.

Figure 4:
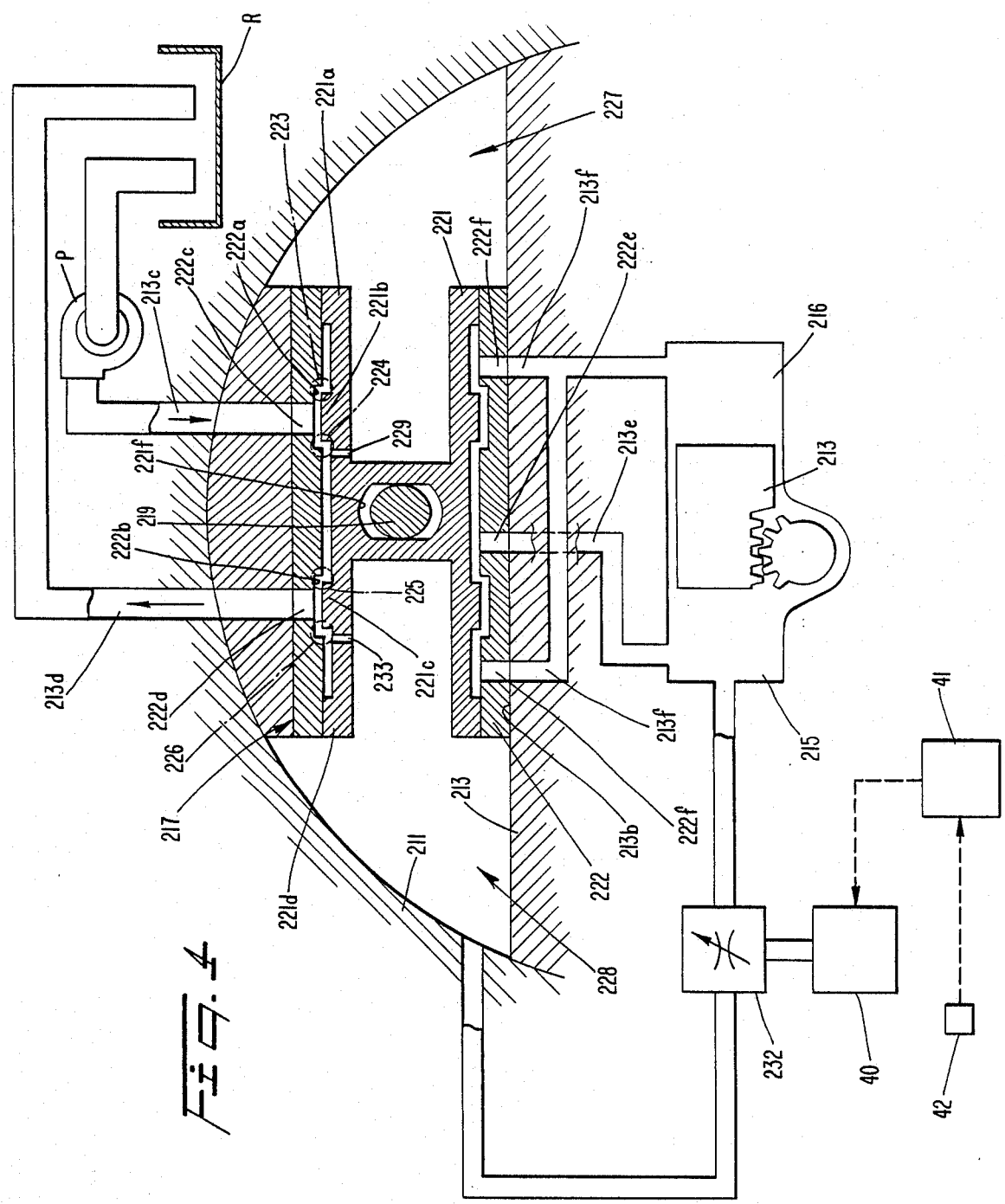
FIG. 4 is a view similar to FIG. 1, showing a power steering system according to still another embodiment.
Figure 5:
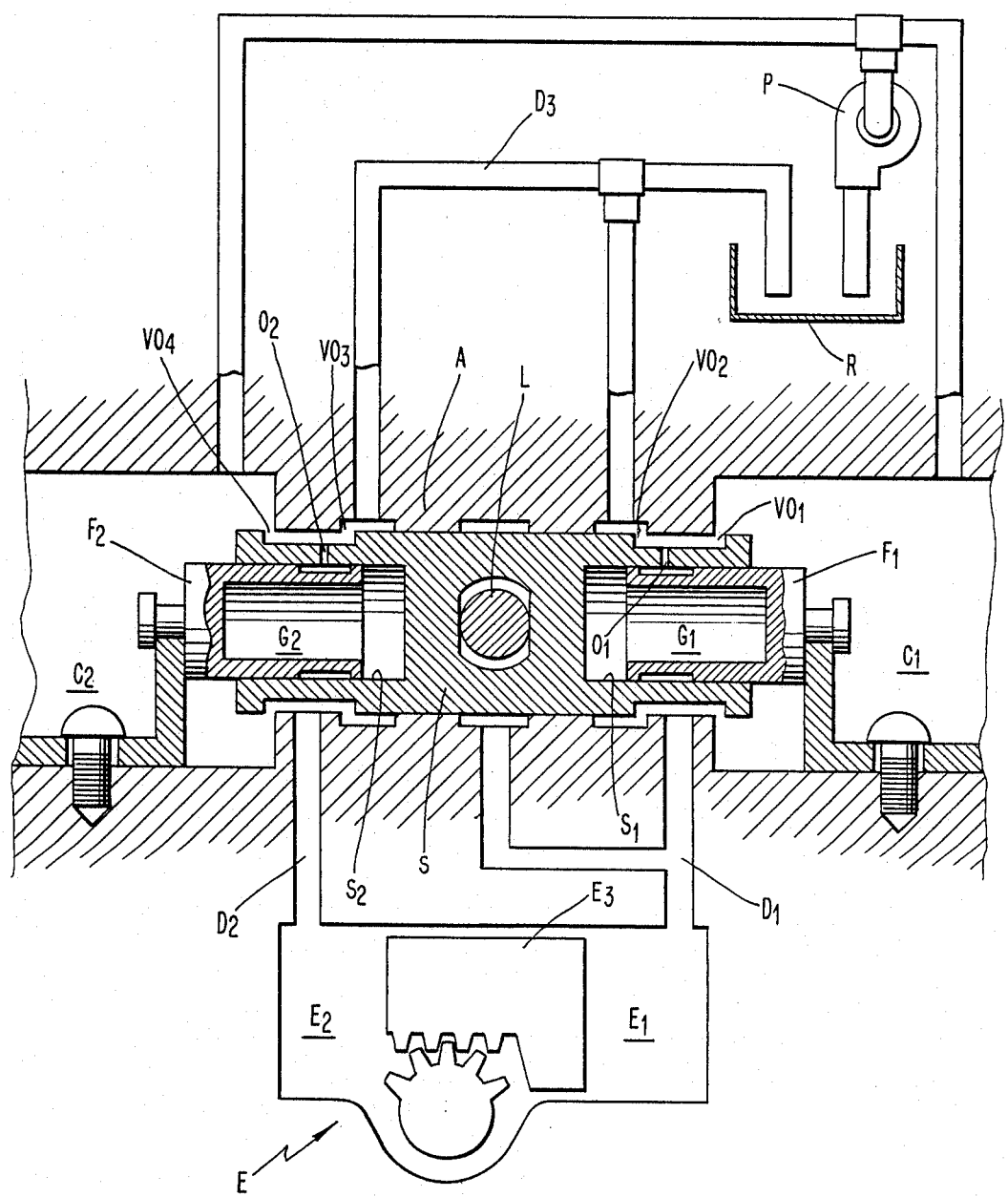
FIG. 5 is a cross-sectional view of a conventional power steering system.

FIG. 4 shows still another embodiment of the present invention. Those parts shown in FIG. 4 which are identical to the parts shown in FIG. 1 are denoted by identical reference characters of FIG. 1 as added to 200. As illustrated in FIG. 4, a third orifice 232 comprises a variable orifice disposed out of a housing 311. The third orifice 232 is operated by an electrically operated actuator 40 controlled by a controller 41. The controller 41 is responsive to a signal from a vehicle speed sensor 42 for supplying an electric current to the actuator 40 dependent on the speed of the vehicle to intermittently or continuously reduce the thrid orifice 232 as the vehicle speed increases. The higher the vehicle speed, the greater the differential pressure between reactive pressure chambers 227, 228 becomes to make the steering wheel heavy in turning the same, so that the steering wheel can be prevented from being turned excessively particularly when the vehicle is running at high speeds.

With the present invention, the control valve device is simple in construction, small in size, and inexpensive to manufacture, and the valve spool is highly resistant to vibrations for giving the driver an improved feel in operating the steering wheel.

Although certain preferred embodiments have been shown and described, it should be understood that many changes and modifications may be made therein without departing from the scope of the appended claims.

What is claimed is:

1. A power steering system for use in a motor vehicle, comprising:
   (a) a reciprocable fluid-pressure cylinder assembly for moving a steering link mechanism of the motor vehicle, said reciprocable fluid-pressure cylinder assembly having first and second fluid-pressure chambers and a piston disposed therebetween and coupled to an input shaft;
   (b) a reservoir;
   (c) a fluid-pressure pump for supplying a working fluid from the reservoir to said reciprocable fluid-pressure cylinder assembly;
   (d) a control valve device comprising a valve cylinder having a first passage communicating with said fluid-pressure pump, a second passage communicating with said reservoir, and further passages communicating with said first and second fluid-pressure chambers, and a valve spool slidably disposed in said valve cylinder and axially movable therein in response to rotation of said input shaft, the arrangement being such that when said input shaft is rotated in one direction, the working fluid flows from said pump into said first fluid-pressure chamber and flows from the second fluid-pressure chamber into said reservoir, and when said input shaft is rotated in the opposite direction, the working fluid flows from said pump into said second fluid-pressure chamber and flows from said first fluid-pressure chamber into said reservoir;
   (e) a first reactive pressure chamber in which a first end of said valve spool is exposed, said first reactive pressure chamber communicating with said first fluid-pressure chamber only through a first orifice; and
   (f) a second reactive pressure chamber in which a second end of said valve spool is exposed, said second reactive pressure chamber communicating with said first fluid-pressure chamber through a third orifice and with said second fluid-pressure chamber through a second orifice, said second reactive pressure chamber further communicating with said first reactive pressure chamber through said third orifice and said first orifice, said third orifice being communicated with said first orifice through a third passage defined by a space between said spool and said valve cylinder which connects said first orifice with one of said fluid-pressure pump and said reservoir when said input shaft is rotated in a respective one of said one direction and said opposite direction.

2. A power steering system according to claim 1, including a plug fitted in an axial bore in said valve spool in a fluid-tight manner and having a fourth orifice therethrough, said second reactive pressure chamber being divided by said plug into first and second chambers which are held in communication with each other through said fourth orifice, said first chamber being disposed in said valve spool.

3. A power steering system according to claim 1, wherein said third orifice comprises a variable orifice.

4. A power steering system according to claim 1, wherein said first, second and third orifices are defined in said valve spool.

5. A power steering system according to claim 1, wherein said first end of said valve spool presents an uninterrupted end surface to said first reactive pressure chamber so that the entire area of said end surface is utilized as a reaction surface against which fluid in the first reactive pressure chamber acts.

* * * * *